No. 802,613. PATENTED OCT. 24, 1905.
F. H. VAN HOUTEN.
DOUGH DIVIDER.
APPLICATION FILED MAR. 23, 1905.
2 SHEETS—SHEET 1.
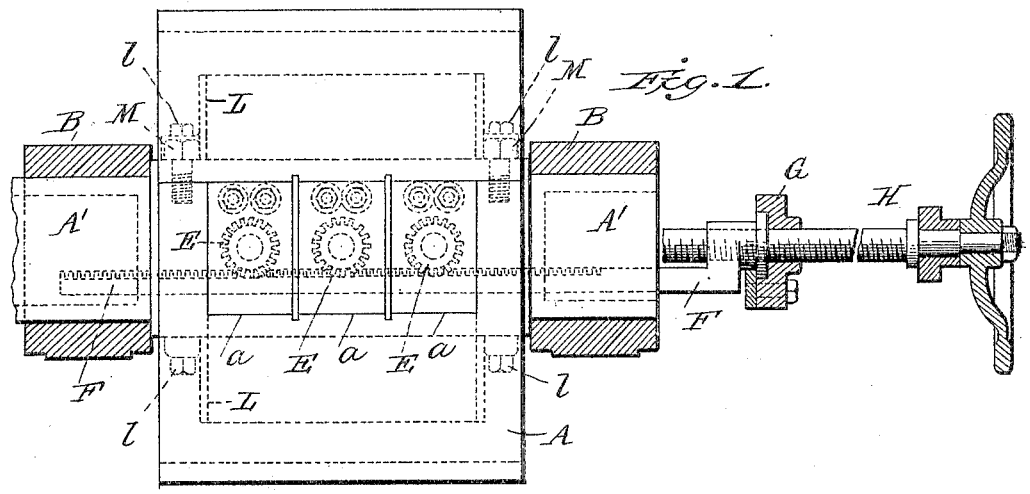
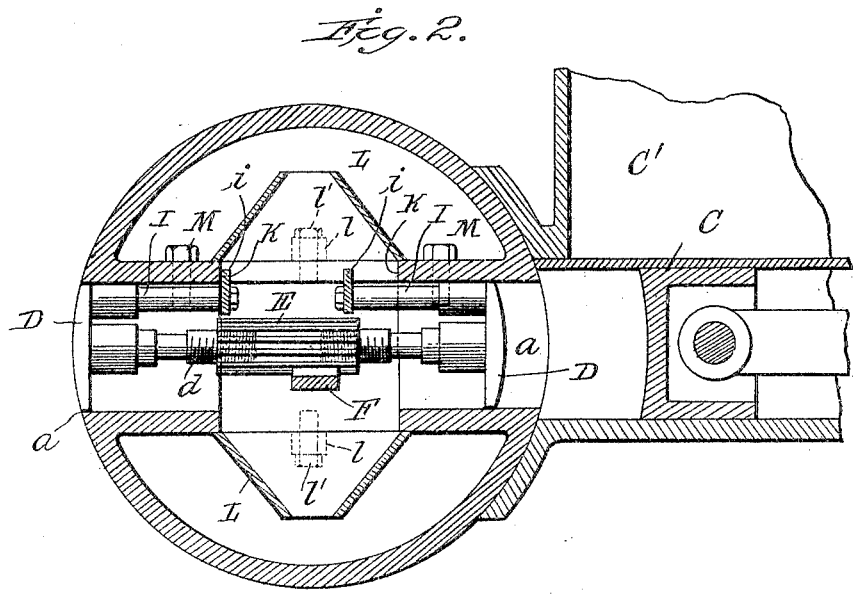
Witnesses
Edwin L. Jewell
Thomas Durant
Inventor
Frank H. Van Houten
By Church & Church
his Attorneys

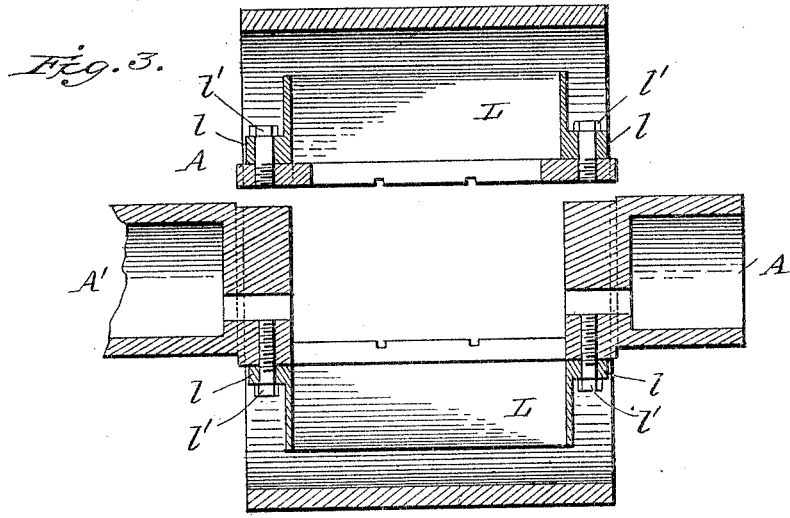
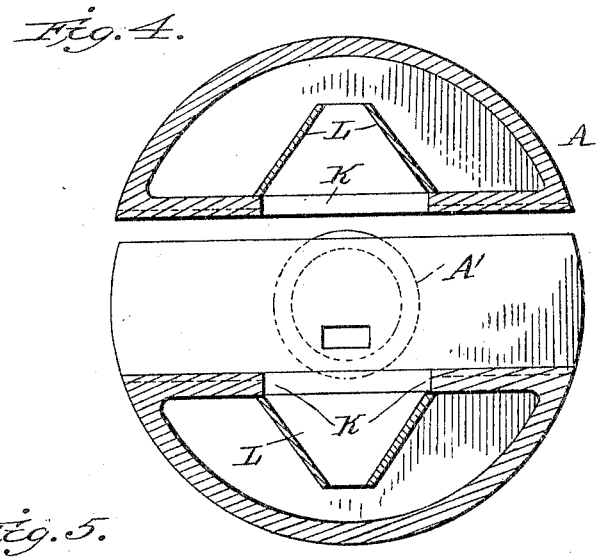
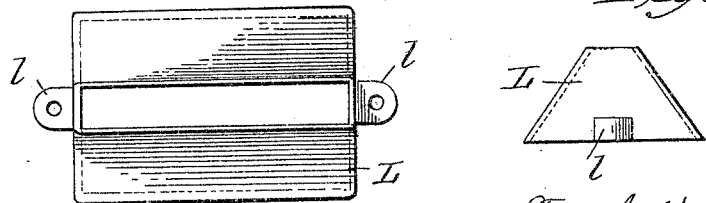

UNITED STATES PATENT OFFICE.

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-DIVIDER.

No. 802,613.　　　　Specification of Letters Patent.　　　　Patented Oct. 24, 1905.

Application filed March 23, 1905. Serial No. 251,621.

*To all whom it may concern:*

Be it known that I, FRANK H. VAN HOUTEN, a citizen of the United States, residing at Fishkill-on-the-Hudson, in the county of Dutchess and State of New York, have invented certain new and useful Improvements in Dough-Dividers; and I do hereby declare the following to be a full, clear, and exact description of the same, reference being had to the accompanying drawings, forming a part of this specification, and to the letters of reference marked thereon.

This invention relates to the class of dough-dividers described in my contemporaneous applications Serial Nos. 207,837, filed May 13, 1904, and 238,949, filed December 30, 1904, the invention of the present application relating more especially to the construction of the cylindrical measuring head or part containing the adjustable receptacles into which the dough is forced and by which it is separated into aliquot parts. In dough-dividers of this class and, in fact, in any dough-dividers wherein the measuring-receptacles are in a rotary head or in a head adapted to be alternately brought into registry with a forcing mechanism for the reception of the dough and moved away from or out of registry with said forcing mechanism for the discharge of the dough it is found that small particles of the dough, together with flour-dust, &c., will work into the mechanism of the measuring devices and if not removed will ultimately choke the same or at least introduce an element of uncertainty and inaccuracy in their operation.

It is an object of the present invention to overcome this and to provide a means whereby the material which heretofore caused difficulty will be automatically discharged from the head or working parts of the measuring devices.

The invention consists in certain novel details of construction, combinations, and arrangements of parts, all as will be now described, and pointed out more particularly in the appended claims.

Referring to the accompanying drawings, Figure 1 is an elevation, with parts in section, of a measuring-head and associated parts of a dough-divider embodying the present improvements. Fig. 2 is a central vertical section in a plane at right angles to Fig. 1 and showing a portion of the forcing mechanism. Fig. 3 is a detail section in a plane longitudinal of the axis of the measuring-head with some of the parts separated and the mechanical devices for controlling the followers omitted. Fig. 4 is a sectional view in a plane central of and at right angles to Fig. 3. Fig. 5 is a plan, and Fig. 6 an elevation, of one of the conical guards adapted to be located within the measuring-head.

Like letters of reference in the several figures indicate the same parts.

The dough-divider in connection with which the present invention is illustrated embodies in general construction a cylindrical measuring-head A, having journals A', carried in bearings B of the main frame, said head being preferably formed in separable sections, as shown in Figs. 3 and 4, so as to be readily assembled or taken apart for convenience in the manufacture or formation of the transverse channel or channels which form the measuring-receptacles $a$. The measuring-receptacles $a$ are adapted to be brought periodically into registry with a forcing mechanism, which may consist of a plunger C, Fig. 2, working in a suitable channel beneath a hopper C', and in the operation of the machine when the measuring-receptacle or all the receptacles on one side of the head have been filled by the forcing mechanism the head is given a partial rotation—usually a half-turn—bringing the filled receptacles into position for their contents to be discharged and other receptacles into registry with the forcing mechanism. In this particular embodiment the receptacles have within them followers D, with screw-threaded stems $d$, united by a pinion sleeve or nut E, the latter being capable of adjustment through the medium of a rack-bar F, swiveled at its outer end in a sliding nut G, adapted to be adjusted by a screw and hand-wheel H, whereby the followers may during the operation of the machine be readily adjusted toward and from each other to vary the capacity of the receptacles.

To limit the outward movement of the followers, they may be provided with inwardly-extending stems I, to the inner ends of which stop plates or bars $i$ may be attached and adapted to contact with shoulders formed on the measuring-head. As illustrated, the shoulders are formed by the side walls of longitudinal slots or openings K in the side walls of the channels constituting the measuring-receptacles, such openings K, however, being located between the receptacles proper or at such points that the followers never retreat far enough to pass the edge of the openings. The openings K in the top and bottom faces of the channels which constitute the measuring-receptacles serve as a means for the ready escape of any particles of dough or accumulations of dust from the interior of the head; but in practice it is found that the rotation of the head or its movement to bring the receptacles successively into registry with the forcing mechanism would cause the particles of dough and dust to fall back into the adjusting mechanism and in time would interfere with the operation of the same. In order to overcome this difficulty, conically-shaped guard-flanges have been placed around said openings so as to project outwardly into the measuring-head at each side of the receptacles, and in the preferred construction removable guards L, preferably frusto-conical in cross-section, as shown in Fig. 4, are mounted in each section of the head with their bases over and registering with the openings K.

If desired, the ends of the cylindrical head may be left entirely open, as shown in Fig. 3, so that material passing out through the guards L may find its way to the floor through the open ends of the head.

Obviously the guards L may be held in place by any suitable means; but as a convenient means I show lugs $l$ at each end, through which retaining-screws $l'$ may pass into the head, and the sections of the head itself may be conveniently held together by bolts or screws M. (Best seen in Fig. 2.)

In operation it is found that accumulations in the measuring-head will be discharged through the guards L and having once passed out through the small openings in said guards can never find their way back into the mechanism contained within the head; but, on the contrary, the constant motion of the head will cause said accumulations to be rolled into pellets, which readily free themselves both from the parts with which they contact and from each other, so that there is no formation of a solid mass, and the effect is to keep the internal working parts entirely free from all injurious accumulations of any character.

Having thus described my invention, what I claim as new, and desire to secure by Letters Patent, is—

1. A measuring mechanism for dough-dividers embodying a movable head having measuring-chambers therein, followers in said chambers for discharging the dough therefrom and transverse openings intermediate said followers for the escape of accumulations from between the followers and means for preventing the inward movement of accumulations through the transverse openings.

2. A measuring mechanism for dough-dividers embodying a movable head having a transverse channel therein, with lateral openings in its intermediate portion, followers in said channel adapted to form the inner walls of the measuring-receptacles, controlling mechanisms intermediate the followers and means for preventing the inward movement of accumulations through the transverse openings in the walls of the channel.

3. A measuring mechanism for dough-dividers, embodying a cylindrical head, open at the end and having radial measuring-receptacles therein with a lateral opening between their proximate ends for the escape of accumulations, followers mounted in said receptacles and controlling mechanism intermediate the followers and within the head; substantially as described.

4. A measuring mechanism for dough-dividers, embodying a hollow head, having transverse measuring-receptacles therein, lateral openings between said receptacles for the escape of accumulations, outwardly-extending guards around said openings for preventing the return of discharged accumulations, followers in the receptacles and controlling mechanism intermediate the followers; substantially as described.

5. A measuring mechanism for dough-dividers, embodying a hollow cylindrical head, having measuring-receptacles therein formed by transverse channels in the head with lateral openings intermediate the receptacles, outwardly-extending guards having inclined walls surrounding said openings, followers in the receptacles and controlling mechanism intermediate the followers; substantially as described.

6. A measuring mechanism for dough-dividers embodying a hollow cylindrical head formed of separable segments and having measuring-chambers formed by a channel extending through the head parallel with the plane of separation of the segments, the wall forming said channel being cut away to permit the discharge of accumulations intermediate the measuring-receptacles; substantially as described.

7. The combination with a cylindrical hollow rotary measuring-head having measuring-receptacles therein and lateral openings intermediate said receptacles for the discharge of accumulations from between the receptacles, of a guard of frusto-conical form in cross-section for preventing the return of said accumulations; substantially as described.

8. In a measuring mechanism for dough-dividers, the combination with the rotary cylindrical measuring-head having measuring-chambers therein and lateral openings between said chambers for the discharge of accumulations, of removable guards surrounding said lateral openings for preventing the return of the discharged accumulations during the rotation of the head; substantially as described.

FRANK H. VAN HOUTEN.

Witnesses:
J. E. VAN HOUTEN,
C. VAN NOSTRAN.